(12) United States Patent
Brenner et al.

(10) Patent No.: US 10,651,516 B2
(45) Date of Patent: May 12, 2020

(54) SIGNAL CONNECTOR FOR A BATTERY MODULE

(71) Applicant: Johnson Controls Advanced Power Solutions GMBH, Hannover (DE)

(72) Inventors: Helge Brenner, Hannover (DE); Markus Hoh, Wunstorf (DE); Ralf Joswig, Buchholz (DE); Martin Wiegmann, Borstel (DE)

(73) Assignee: Clarios Advanced Solutions GmbH, Hannover (DE)

( * ) Notice: Subject to any disclaimer, the term of this patent is extended or adjusted under 35 U.S.C. 154(b) by 71 days.

(21) Appl. No.: 16/081,856

(22) PCT Filed: Mar. 3, 2017

(86) PCT No.: PCT/EP2017/055039
§ 371 (c)(1),
(2) Date: Aug. 31, 2018

(87) PCT Pub. No.: WO2017/149135
PCT Pub. Date: Sep. 8, 2017

(65) Prior Publication Data
US 2019/0089017 A1 Mar. 21, 2019

(30) Foreign Application Priority Data
Mar. 3, 2016 (DE) .......................... 10 2016 103 839

(51) Int. Cl.
*H01M 10/42* (2006.01)
*H01M 10/48* (2006.01)
(Continued)

(52) U.S. Cl.
CPC .......... *H01M 10/4257* (2013.01); *B60T 1/10* (2013.01); *F16D 61/00* (2013.01); *H01M 2/1077* (2013.01);
(Continued)

(58) Field of Classification Search
CPC ............ H10R 13/629; H01M 10/4257; H01M 2/0237; H01M 2/04; H01M 2/043; H01M 2/0434
See application file for complete search history.

(56) References Cited

U.S. PATENT DOCUMENTS 5,389,462 A * 2/1995 Lin ....................... H01M 2/043
429/121
5,931,688 A * 8/1999 Hasz .................... H01R 13/748
439/247

(Continued)

FOREIGN PATENT DOCUMENTS

DE 102012205910 A1 10/2013
JP H07225327 8/1995

OTHER PUBLICATIONS

International Search Report and Written Opinion for PCT/EP2017/055039 dated Apr. 20, 2017. 12 pages.

*Primary Examiner* — Matthew J Merkling
(74) *Attorney, Agent, or Firm* — Boardman & Clark LLP

(57) ABSTRACT

The present disclosure relates to a battery module that includes a housing having a first opening configured to receive one or more battery cells and an electrical component, a housing cover configured to be disposed over the first opening to enclose the one or more battery cells and the electrical component in the housing, a signal connector disposed within the housing and electrically coupled to the electrical component, where the signal connector is configured to be actuated from a first position to a second position, and a vent port in alignment with the signal connector such that the signal connector is accessible to a push device passing through the vent port to facilitate directing the signal connector into the second position and toward a second opening of the housing cover when the housing cover is disposed over the first opening.

17 Claims, 8 Drawing Sheets

(51) Int. Cl.
*B60T 1/10* (2006.01)
*F16D 61/00* (2006.01)
*H01M 2/10* (2006.01)

(52) U.S. Cl.
CPC ..... *H01M 10/48* (2013.01); *B60B 2310/3026* (2013.01)

(56) References Cited

U.S. PATENT DOCUMENTS

| | | | |
|---|---|---|---|
| D450,653 S * | 11/2001 | Hertel | D13/119 |
| 6,799,993 B2 * | 10/2004 | Krieger | H01M 2/1005 439/500 |
| 7,244,148 B2 * | 7/2007 | Maguire | B60L 3/0069 439/620.28 |
| 7,880,628 B2 | 2/2011 | Yoo | |
| 7,990,738 B2 * | 8/2011 | Urrea | H01H 85/12 361/833 |
| 8,709,636 B2 | 4/2014 | Oury | |
| 2011/0065331 A1 * | 3/2011 | Takagi | H01R 13/113 439/733.1 |
| 2014/0080339 A1 | 3/2014 | Ebisawa | |
| 2015/0349316 A1 * | 12/2015 | Fink | H01M 2/28 429/159 |

\* cited by examiner

SIGNAL CONNECTOR FOR A BATTERY MODULE

BACKGROUND

The present disclosure relates generally to the field of batteries and battery modules. More specifically, the present disclosure relates to a signal connector of a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may include electrical components disposed within a housing of the battery module. Such electrical components may ultimately be electrically coupled to a control module of an xEV (e.g., a vehicle control module (VCM)). In some cases, the electrical components may be connected to a signal connector, which may be configured to receive (e.g., couple with) an output connector that is coupled to the VCM or other control module of the xEV. However, it may be difficult and/or time consuming to seal the battery module housing and ensure that the signal connector is accessible to the output connector.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a housing having a first opening configured to receive one or more battery cells and an electrical component, a housing cover configured to be disposed over the first opening to enclose the one or more battery cells and the electrical component in the housing, a signal connector disposed within the housing and electrically coupled to the electrical component, where the signal connector is configured to be actuated from a first position to a second position, and a vent port in alignment with the signal connector such that the signal connector is accessible to a push device passing through the vent port to facilitate directing the signal connector into the second position and toward a second opening of the housing cover when the housing cover is disposed over the first opening.

The present disclosure also relates to a battery module that includes a housing having an opening holding one or more battery cells and an electrical component, a housing cover disposed over the opening to enclose the one or more battery cells and the electrical component in the housing, a signal connector electrically coupled to the electrical component, a vent port, and a laser weld adhering the signal connector to the housing cover in a coupling such that the signal connector may receive an output connector to enable communication with a control module. The coupling is formed by a process that includes disposing the signal connector in the housing in a first position, disposing the housing cover over the opening of the housing, and directing the signal connector to a second position and into engagement with an opening in the housing cover, where a surface of the signal connector contacts an inner surface of the housing cover when the signal connector is in the second position.

The present disclosure also relates to a method for manufacturing a battery module that includes disposing a signal connector in a housing of the battery module in a first position, disposing a housing cover over an opening of the housing, directing the signal connector to a second position, where a surface of the signal connector contacts an inner surface of the housing cover when the signal connector is in the second position, directing a laser toward an outer surface of the housing cover, and melting at least a portion of the surface of the signal connector, the inner surface of the housing cover, or both, to form a molten material such that the molten material re-hardens to couple the signal connector to the housing cover.

The present disclosure also relates to a battery module that includes a housing, at least one battery cell disposed in the housing, at least one electrical component disposed in the housing, a housing cover coordinating with the housing to enclose the at least one battery cell and the at least one electrical component, a signal connector disposed within the housing and electrically coupled to the electrical component, where the signal connector is configured to be actuated from a first position to a second position, and a vent port in alignment with the signal connector such that a push member of the signal connector is accessible to a push device passing through the vent port to facilitate directing the signal connector from the first position into the second position and toward an opening of the housing cover.

DRAWINGS

Various aspects of this disclosure may be better understood upon reading the following detailed description and upon reference to the drawings in which.

DETAILED DESCRIPTION

Figure 1:
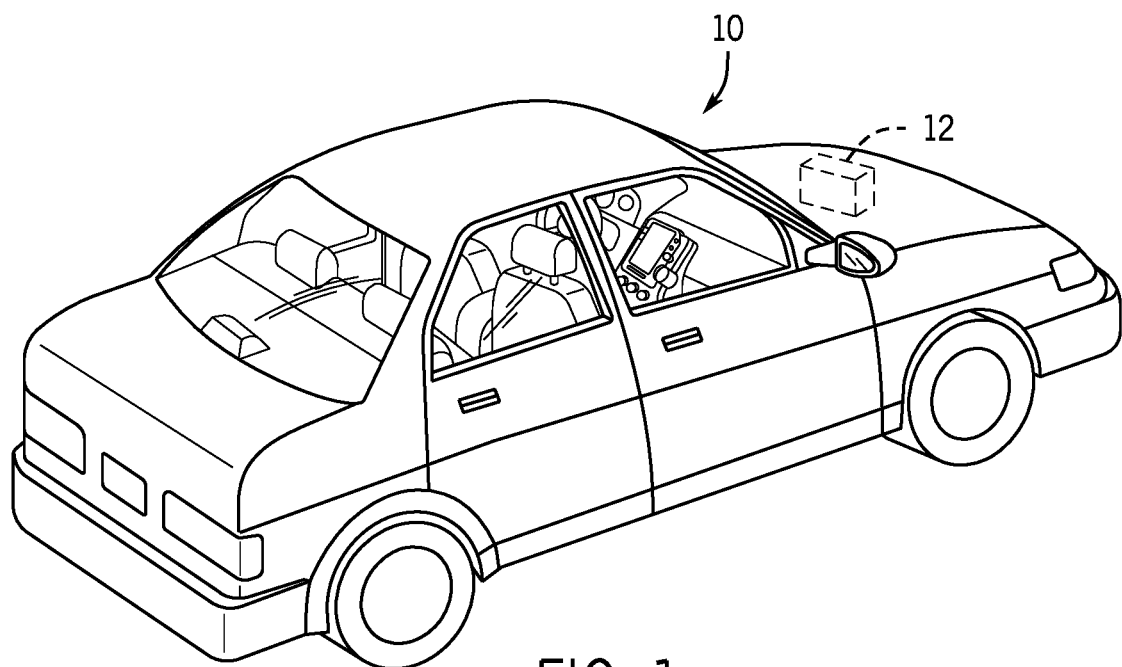
FIG. 1 is a perspective view of a vehicle having a battery system configured in accordance with present embodiments to provide power for various components of the vehicle, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Battery modules may include one or more battery cells (electrochemical battery cells) that may be disposed in a housing. In addition, the housing may include one or more electrical components that may be used to monitor a condition of the one or more battery cells. For example, sensing components may be coupled to cabling configured to carry signals generated by the sensing components to a battery control unit ("BCU"), a battery management system ("BMS"), a printed circuit board ("PCB"), or another special purpose computing device (e.g., a vehicle control module ("VCM")). The cabling may be coupled to a signal connector, which may be configured to receive (e.g., couple to) an output connector (e.g., a VCM connector, a BMC connector, a BCU connector). However, when disposing a cover over an opening of the battery module housing (e.g., to seal the module), the signal connector may be substantially inaccessible such that welding the signal connector to the housing and/or coupling the signal connector to the output connector may not be feasible.

The present disclosure addresses these and other shortcomings of traditional techniques. For example, embodiments of the present disclosure relate to disposing the signal connector in the housing in a first position and subsequently directing the signal connector to a second position when the housing has been sealed with a housing cover. When the signal connector is in the second position, the signal connector may be welded to the housing and/or the housing cover such that the output connector may be coupled to the signal connector to establish a secure electrical connection. Therefore, the electrical components in the battery module may communicate with a control device external to the battery module (e.g., the BCU, BMC, and/or VCM). While the present disclosure focuses discussion on laser welding the signal connector to the housing, it should be recognized that other types of welding are within the scope of the present disclosure.

To help illustrate the manner in which the present embodiments may be used in a system, FIG. 1 is a perspective view of an embodiment of a vehicle 10 (e.g., an xEV), which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles. Further, embodiments may be employed in stationary power systems as well.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10).

Figure 2:
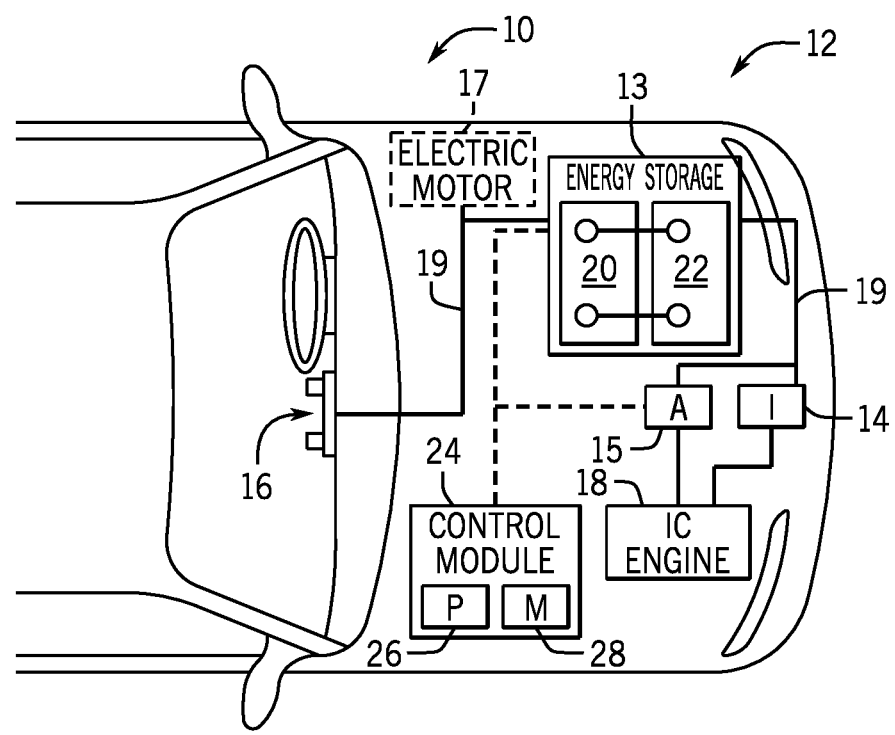
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells (e.g., individually sealed battery cells). In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within the energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine a temperature of each battery module 20 or 22, control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

Figure 3:
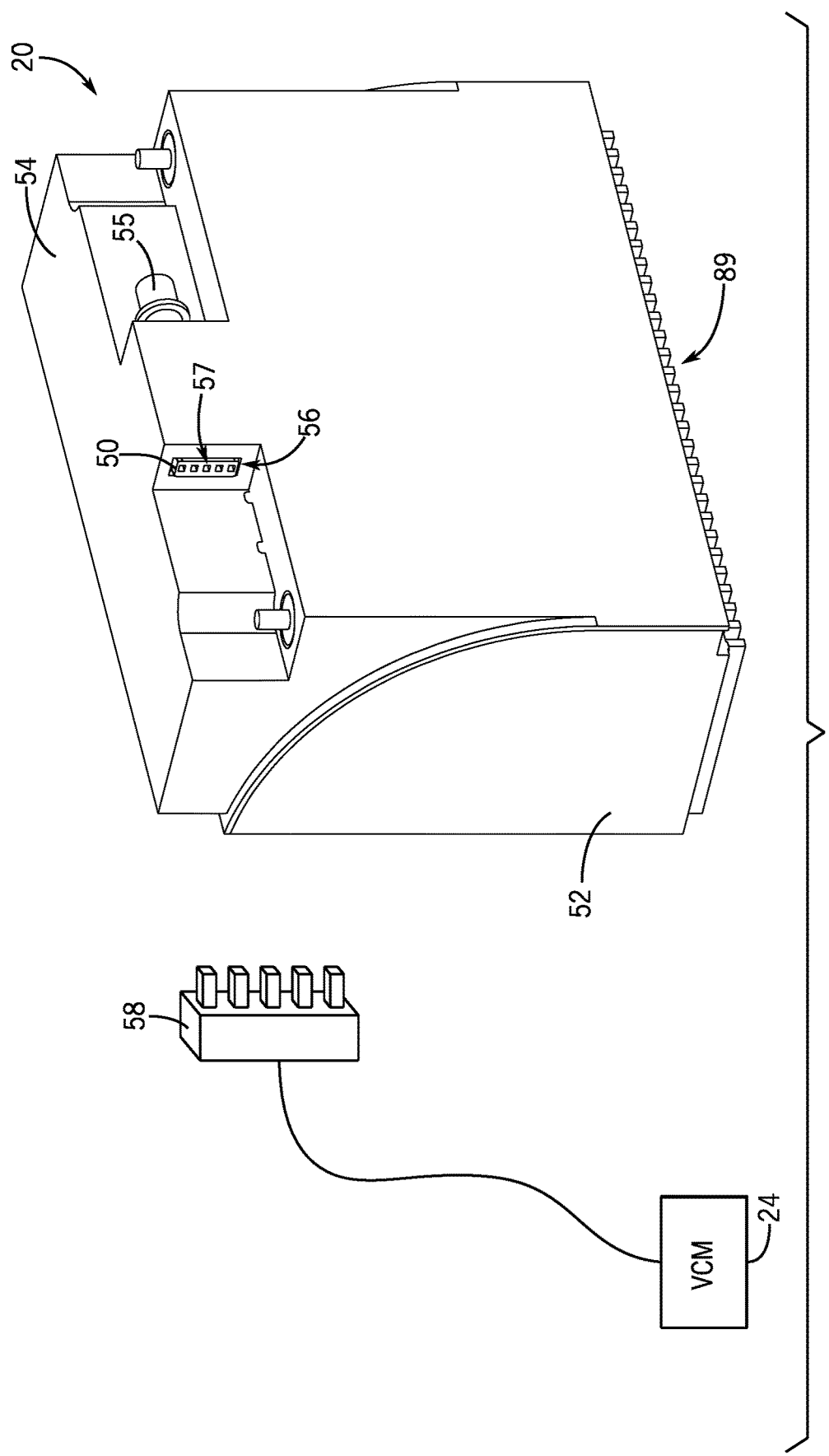
FIG. 3 is a perspective view of a battery module that includes a signal connector coupled to a housing and/or a housing cover of the battery module, in accordance with an aspect of the present disclosure.

As discussed above, the battery module 20 may include electrical components that are configured to be electrically coupled to the control module 24 or another control device (e.g., a VCU) external to the battery module 20. Therefore, as shown in FIG. 3, the battery module 20 may also include a signal connector 50 that may be utilized to establish the electrical connection between electrical components in the battery module 20 and the control module 24, for example. As discussed with reference to FIG. 2, the control module 24 may be disposed in the vehicle 10 and outside of a housing 52 of the battery module 20. Accordingly, it may be desirable to position the signal connector 50 such that the signal connector 50 is accessible when a housing cover 54 is disposed over the housing 52 of the battery module 20.

For example, FIG. 3 is a perspective view of the battery module 20 in its assembled form and including the signal connector 50 coupled (e.g., laser welded) to the housing cover 54 and/or the housing 52. Additionally, the battery module 20 includes a vent port 55 that may be utilized to emit effluent and/or other emissions from battery cells within the housing 52 into a venting feature of the xEV 10 (e.g., a vent hose). In accordance with embodiments of the present disclosure, a pushing device may be inserted in the vent port 55 to move the signal connector 50 from a first position to a second position when the housing cover 54 has been disposed over the housing 52. That is, at least a portion of the signal connector 50 is accessible through the vent port 55 (e.g., for manipulation). Accordingly, the signal connector 50 may contact the housing cover 54 such that the two components may be coupled to one another (e.g., via a weld). The process of moving the signal connector 50 from the first position to the second position and welding the signal connector 50 to the housing cover 54 is discussed in more detail below with reference to FIGS. 7-9.

As shown in the illustrated embodiment of FIG. 3, an opening 56 in the housing cover 54 enables a connecting portion 57 of the signal connector 50 to be accessible to an output connector 58, which may be coupled to the control module 24 (e.g., the VCU). Accordingly, the signal connector 50 may receive the output connector 58, or vice versa (e.g., the signal connector 50 may include a male connector or a female connector), to establish communication between electrical components in the battery module 20 and the control module 24. For example, the electrical components in the battery module 20 may be configured to monitor a condition of one or more battery cells disposed in the battery module 20 and/or to perform an output commanded by the control module 24. In certain embodiments, the control module 24 may be configured to adjust operating parameters of the battery module 20 (e.g., via the electrical components) in response to feedback provided by the electrical components.

Figure 4:
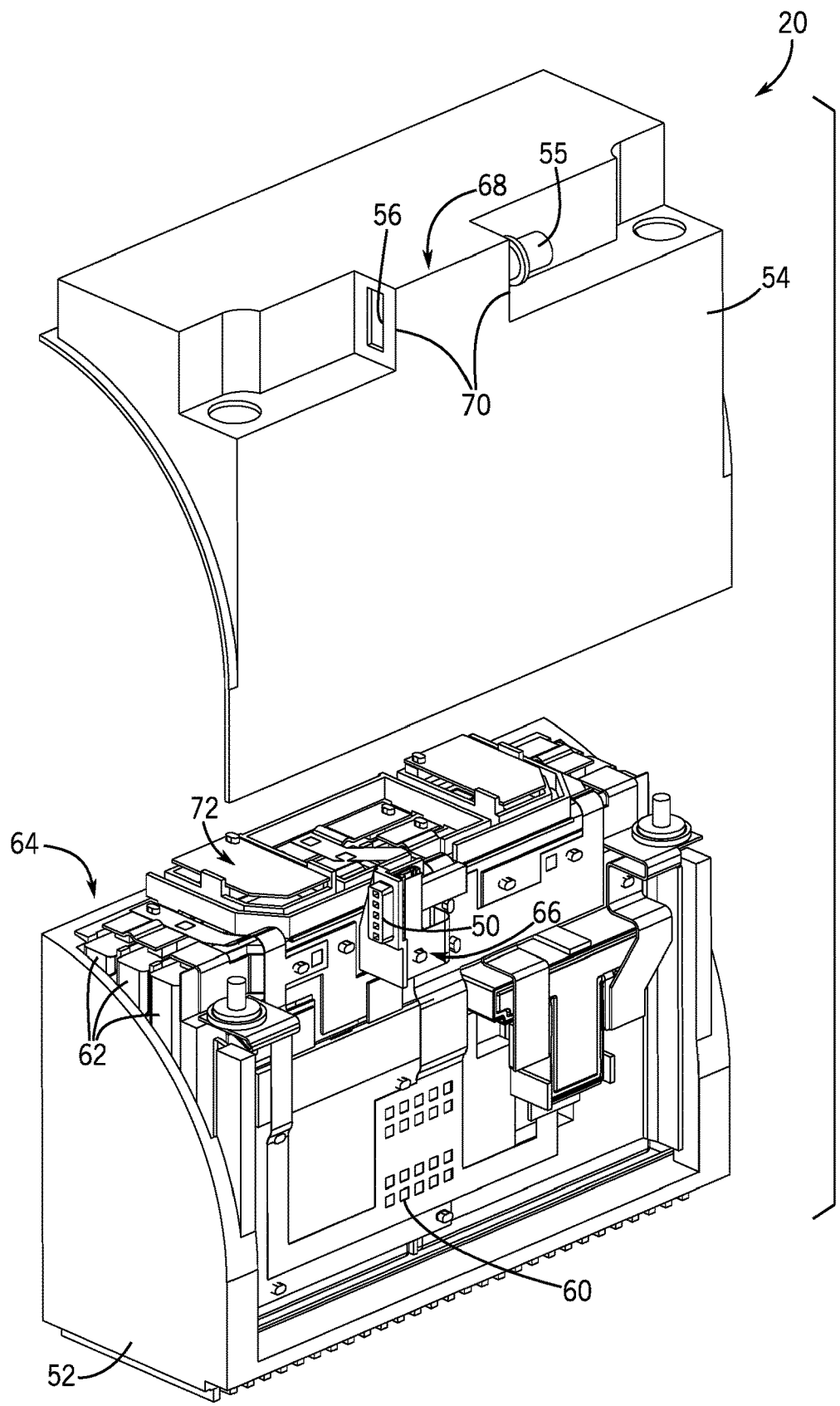
FIG. 4 is an exploded perspective view of the battery module of FIG. 3 that shows electrical components and battery cells disposed in the housing, in accordance with an aspect of the present disclosure.

For example, FIG. 4 is an exploded perspective view of the battery module 20 that shows electrical components 60 and battery cells 62 disposed in the housing 52. In accordance with embodiments of the present disclosure, the signal connector 50 may be disposed in the housing 52 before covering an opening 64 of the housing 52 with the housing cover 54. To avoid blocking the housing cover 54 from being disposed in its final position over the opening 64 of the housing 52, the signal connector 50 may be in a first position 66. The first position 66 may be recessed from the opening 56 in the housing cover 54 such that when the housing cover 54 is disposed over the opening 64, the signal connector 50 is not readily accessible to the output connector 58. Additionally, when in the first position 66, the signal connector 50 may completely fit within a compartment 68 of the housing cover 54. Therefore, by disposing the signal connector 50 in the housing 52 in the first position 66, the housing cover 54 may cover the opening 64 without any obstruction from the signal connector 50 (e.g., the signal connector contacting edges 70 of the housing cover 54 that may block the housing cover 54 from covering the housing 52).

However, when the signal connector 50 is in the first position 66, the signal connector 50 may be inaccessible to the output connector 58, and coupling (e.g., laser welding) the signal connector 50 to the housing cover 54 may not be feasible. Therefore, the signal connector 50 may be directed to a second position, as described below, such that the signal connector 50 may be welded to the housing cover 54, and thus, securely coupled to the output connector 58.

Figure 5:
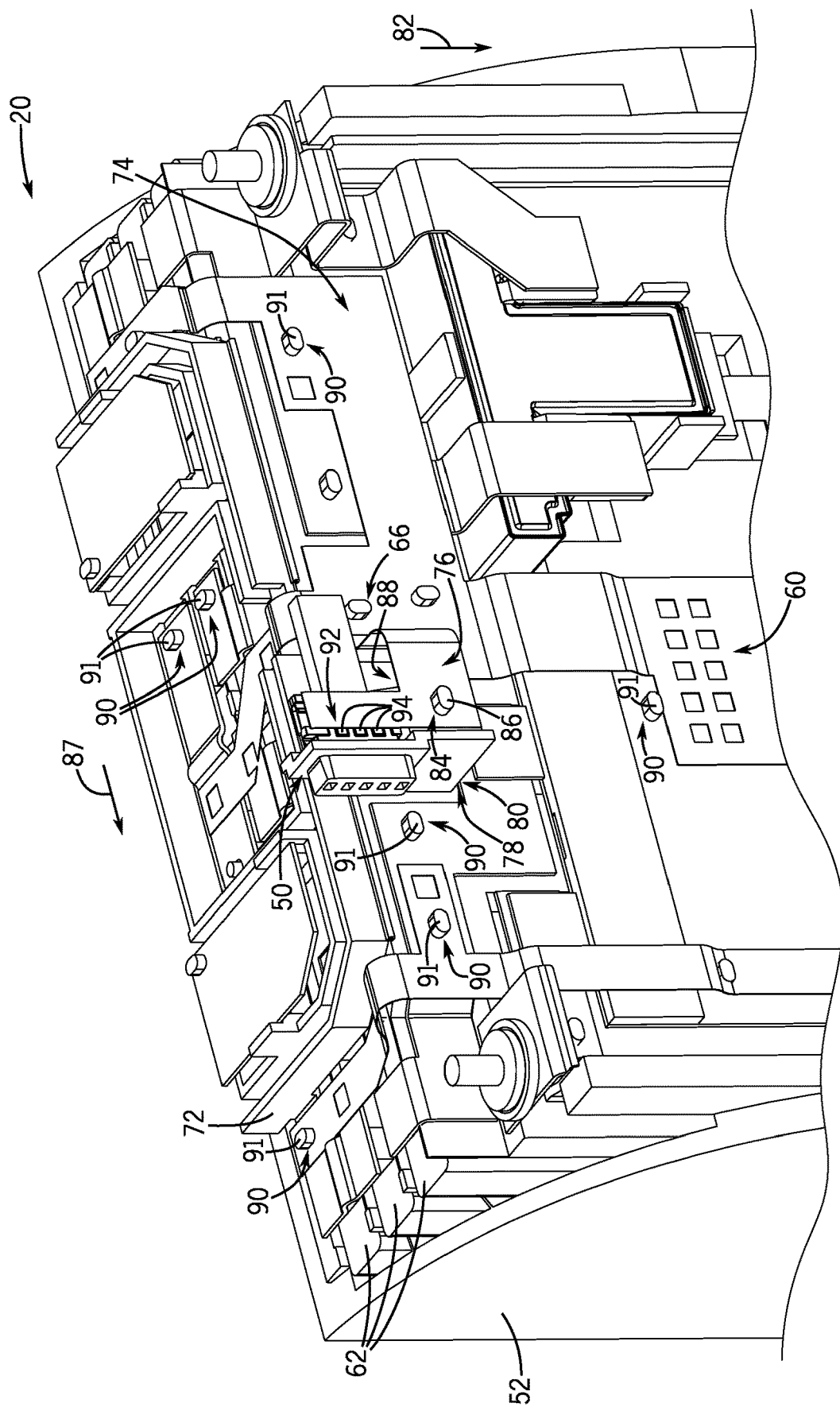
FIG. 5 is an expanded perspective view of the battery module of FIGS. 3 and 4 without the housing cover to show the signal connector in a first position, in accordance with an aspect of the present disclosure.

Before disposing the housing cover 54 over the opening 64 of the housing, the signal connector 50 may be disposed in the housing 52 on a carrier 72. In some embodiments, the carrier 72 may be configured to enable the signal connector 50 to move from the first position 66 to the second position. An example of this is depicted in FIG. 5, which is an expanded perspective view of the battery module 20 without the housing cover 54 to show the signal connector 50 in the first position 66. As shown in the illustrated embodiment of FIG. 5, the signal connector 50 is disposed on the carrier 72, which may include a harness 74 (e.g., a flex foil, carrier foil, and/or cabling). The harness 74 of the carrier 72 may be configured to establish an electrical connection between the battery cells 62, the electrical components 60, and/or the signal connector 50. Additionally, the harness 74 of the carrier 72 may form a receptacle region 76 configured to receive and retain the signal connector 50 in the first position 66. For example, the receptacle region 76 may include a ledge 78 that contacts a first edge 80 of the signal connector 50 to block movement of the signal connector 50 in a direction 82.

Additionally, the receptacle region 76 may include an opening 84 (e.g., slot) that may be configured to receive a protrusion 86 of the signal connector 50. For example, the protrusion 86 may be disposed in the opening 84 such that movement of the signal connector 50 in the direction 82 is further blocked by the receptacle region 76 of the harness 74. However, in certain embodiments, the opening 84 (e.g., slot) may be larger than the protrusion 86, thereby enabling the protrusion 86 to move within the opening 84 in a direction 87 cross-wise (e.g., substantially perpendicular) to the direction 82. Accordingly, the protrusion 86 and the opening 84 may facilitate actuation of the signal connector 50 from the first position 66 to the second position by guiding the signal connector 50 in the direction 87 along a channel 88 formed in the receptacle region 76. Additionally, the direction 87 may be defined by, or substantially parallel to, a bottom surface 89 (e.g., see FIG. 3) of the housing 52 (e.g., a planar length of the housing 52). Accordingly, the signal connector 50 may slide in the direction 87 to move from the first position 66 to the second position. Therefore, the opening 84 may block movement of the signal connector 50 in the direction 82, but enable the signal connector 50 to move in the direction 87.

The carrier 72 (and thus the harness 74) may be secured within the housing 52 of the battery module 20 via a plurality of openings 90 configured to receive protrusions 91 (e.g., bumps and/or projections) of various components (e.g., battery cells 62, the housing 52) of the battery module 20. Accordingly, the carrier 72 may be secured in place with respect to the housing 52, thereby enabling the signal connector 50 to be secured within the housing 52 of the battery module 20 in the first position 66.

In addition to securing the signal connector 50 in the first position 66, the receptacle region 76 may also position the signal connector 50 such that the signal connector 50 may receive signals (e.g., feedback) from, and/or send signals to, the electrical components 60. Accordingly, the signal connector 50 may convey the feedback to the control module 24 and/or perform outputs commanded by the control module 24 once the output connector 58 is coupled to the signal connector 50. As shown in the illustrated embodiment of FIG. 5, the harness 74 of the carrier 72 may also include a coupling member 92 configured to electrically couple the electrical components 60 to the signal connector 50. For example, the coupling member 92 (or the entire harness 74) may include a conductive material that may enable electrical communications to be directed to and from the electrical components 60 and the signal connector 50, and, thus, to and from the output connector. Additionally, the signal connector 50 may include a conductive portion 94 that may be configured to contact the coupling member 92 when the signal connector 50 is in the first position 66 and/or the second position. In other embodiments, the harness 74 may include a non-conductive material and be configured to direct wires or other conductive materials from the signal connector 50 toward a PCB and/or toward the electrical components 60.

Figure 6:
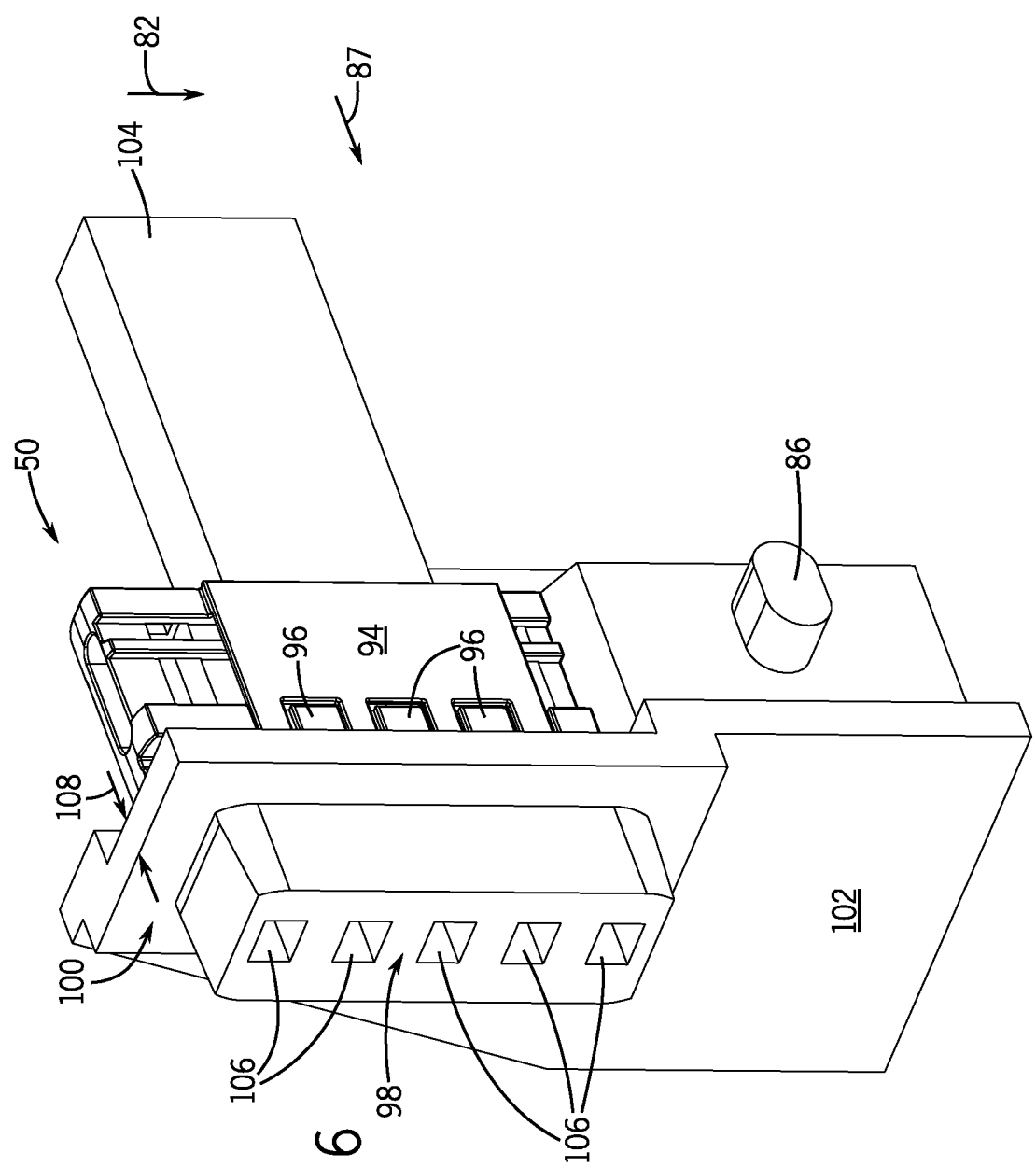
FIG. 6 is a cutaway perspective view of the signal connector of FIG. 5, in accordance with an aspect of the present disclosure.

For example, FIG. 6 is a perspective view of the signal connector 50. As shown in the illustrated embodiment of FIG. 6, the signal connector 50 includes the protrusion 86 as well as the conductive portion 94. The conductive portion 94 of the signal connector 50 is shown as including three conductive pads 96. As discussed above, the conductive portion 94 (e.g., the conductive pads 96) may contact the coupling member 92 of the harness 74 to establish an electrical connection between the electrical components 60 and the signal connector 50. While the conductive portion 94 of the signal connector 50 is illustrated as including the three conductive pads 96, it should be recognized that the conductive portion 94 may be a single, continuous surface disposed on the signal connector 50. In other embodiments, each conductive pad may coupled to a separate wire or conductive material configured to receive signals corresponding to different functions of the battery module 20.

In accordance with embodiments of the present disclosure, the signal connector 50 may also include a coupling adapter 98, a contact surface 100, a base surface 102, and a push member 104. As shown in the illustrated embodiment of FIG. 6, the signal connector 50 includes the coupling adapter 98, which may protrude from the contact surface 100. Accordingly, when the signal connector 50 is directed from the first position 66 to the second position, the coupling adapter 98 may extend through the opening 56 in the housing cover 54 such that the signal connector 50 may connect to the output connector 58. In some embodiments, the coupling adapter 98 may include a plurality of holes 106 that may receive protruding members from the output connector 58. For example, the coupling adapter 98 may include five holes 106 that may receive five (or less) corresponding protruding members from the output connector 58. In other embodiments, the coupling adapter 98 may include less than five holes (e.g., 4, 3, 2, 1, or 0) or more than five holes (e.g., 6, 7, 8, 9, 10, or more). In still further embodiments, the coupling adapter 98 may include protruding members rather than the holes 106 such that the coupling adapter 98 is the male connector and the output connector is the female connector. In any case, each hole 106 and corresponding protruding member may be configured to send and/or receive signals related to a specific function of the battery module 20. In some embodiments, one hole 106 and corresponding protruding member may be coupled to a PCB included in the battery module 20, whereas another hole 106 and corresponding protruding member may be directly coupled to the electrical components 60.

The contact surface 100 may be configured to contact an inner surface of the housing cover 54 when the signal connector 50 is in the second position. For example, the contact surface 100 may include a geometry that corresponds to the inner surface of the housing cover 54. In certain embodiments, the signal connector 50 (or just the contact surface 100) may include an absorptive material configured to absorb thermal energy from a laser, for example. Additionally, the housing cover 54 may include a transparent material (e.g., transparent with respect to certain laser wavelengths). Therefore, when a laser is directed toward the housing cover 54, a laser output (e.g., laser energy) may pass through the housing cover 54 toward the contact surface 100, which may absorb the laser energy. Accordingly, the laser energy absorbed by the contact surface 100 may cause heating that, in turn, melts at least a portion of the contact surface 100 and forms a molten material. As the molten material re-hardens (e.g., when the laser is no longer directed toward the housing cover 54), the contact surface 100 and the inner surface of the housing cover 54 may be coupled to one another (e.g., forming a seal). In some embodiments, the laser weld between the signal connector 50 and the housing cover 54 may form a substantially air-tight and/or water-tight seal.

The contact surface 100 of the signal connector 50 may include a thickness 108 configured to block thermal energy resulting from absorption of the laser output (e.g., laser energy) from reaching the conductive portion 94 of the signal connector 50. For example, the contact surface 100 may absorb the laser energy from the laser passing through the housing cover 54. However, the thickness 108 may be configured to block the laser energy from passing entirely through the contact surface 100 and toward the conductive portion 94. Accordingly, the electrical connection between the signal connector 50 and the electrical components 60 may not be affected by the laser during a laser welding process.

In certain embodiments, the base surface 102 may be recessed (e.g., offset) from the contact surface 100 such that the base surface 102 does not contact the inner surface of the housing cover 54. The contact surface 100 may form a perimeter about the coupling adapter 98 and may be welded to the housing cover 54. As shown in the illustrated embodiment of FIG. 6, the contact surface 100 may include a smaller surface area than the base surface 102. In other embodiments, the contact surface 100 may include a larger surface area than the base surface 102.

Additionally, the push member 104 of the signal connector 50 may be configured to enable the signal connector 50 to be directed from the first position 66 to the second position. For example, a pushing device may be inserted through the vent port 55 to contact the push member 104. The pushing device may then be urged in the direction 87 toward the opening 56 in the housing cover 54 (see FIG. 5), thereby applying a force on the push member 104 in the direction 87. The push member 104 may then direct (e.g., actuate) the signal connector 50 toward the opening 56 in the housing cover 54 until the contact surface 100 contacts the inner surface of the housing cover 54. In addition to enabling the signal connector 50 to move from the first position 66 to the second position, the push member 104 may rest on a ledge and/or another securement feature of the receptacle region 76 to block movement of the signal connector 50 in the direction 82.

Figure 7:
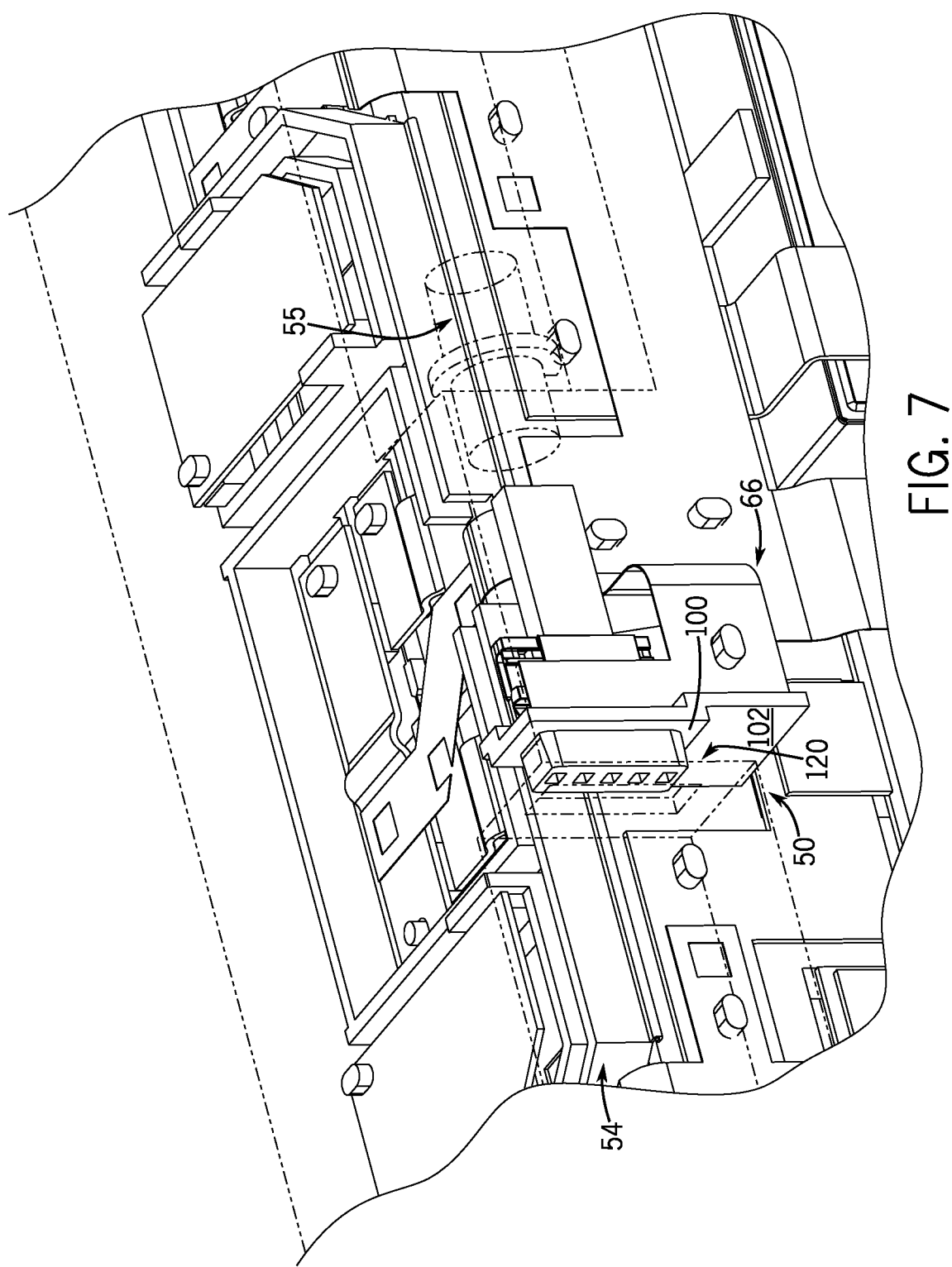
FIG. 7 is a perspective view of the signal connector of FIGS. 5 and 6 in the first position and disposed in the housing sealed with the housing cover, in accordance with an aspect of the present disclosure.

As discussed above, when the signal connector 50 is in the first position 66, the housing cover 54 may be disposed over the opening 64 of the housing 52 without obstruction. However, once the housing cover 54 is disposed over the opening 64, the signal connector 50 may not be accessible to the output connector 58 in the first position 66. For example, FIG. 7 is a perspective view of the signal connector 50 in the first position 66 and disposed in the housing 52 when the housing cover 54 covers the opening 64. The housing cover 54 is illustrated as transparent to better illustrate the position of the signal connector 50. In the illustrated embodiment of FIG. 7, the signal connector 50 is enclosed within the housing cover 54 in the first position 66 and is not readily accessible to the output connector 58 (e.g., the signal connector 50 is recessed within the housing 52 and the housing cover 54). Additionally, the contact surface 100 of the signal connector 50 is not in contact with an inner surface 120 of the housing cover 54 and thus coupling (e.g., laser welding) the signal connector 50 to the housing cover 54 when the signal connector 50 is in the first position 66 may not be feasible.

Figure 8:
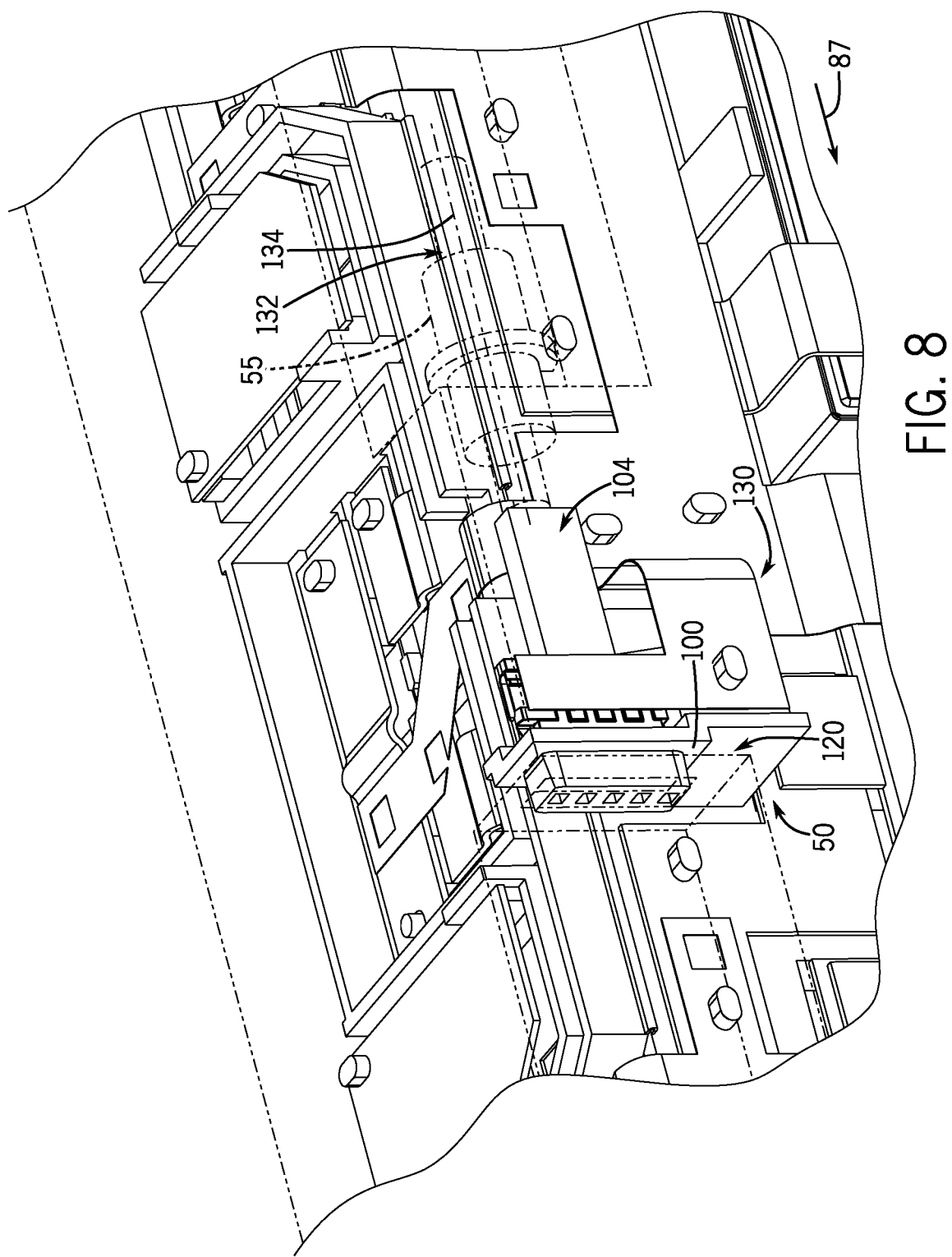
FIG. 8 is a perspective view of the signal connector of FIGS. 5-7 in a second position and disposed in the housing sealed with the housing cover, in accordance with an aspect of the present disclosure.

To form the weld between the housing cover 54 and the signal connector 50, the signal connector 50 may be moved into a second position 130, as shown in FIG. 8. In accordance with embodiments of the present disclosure, the signal connector 50 may be urged into the second position 130 by inserting a push device 132 into the vent port 55 and driving the signal connector 50 from the first position 66 (e.g., FIG. 7) to the second position 130 via a force applied to the push member 104 in the direction 87. As shown in the illustrated embodiment of FIG. 8, the vent port 55 may include a central axis 134 that may be substantially aligned with the push member 104 of the signal connector 50. Accordingly, an assembler may insert the push device 132 into the vent port 55 and urge the push device 132 (e.g., in contact with the push member 104) in the direction 87 until the contact surface 100 contacts the inner surface 120 of the housing cover 54 (e.g., the signal connector 50 cannot move in the direction 87 any further). When the signal connector 50 is in the second position 130, a weld may be formed to couple the signal connector 50 to the housing cover 54.

Figure 9:
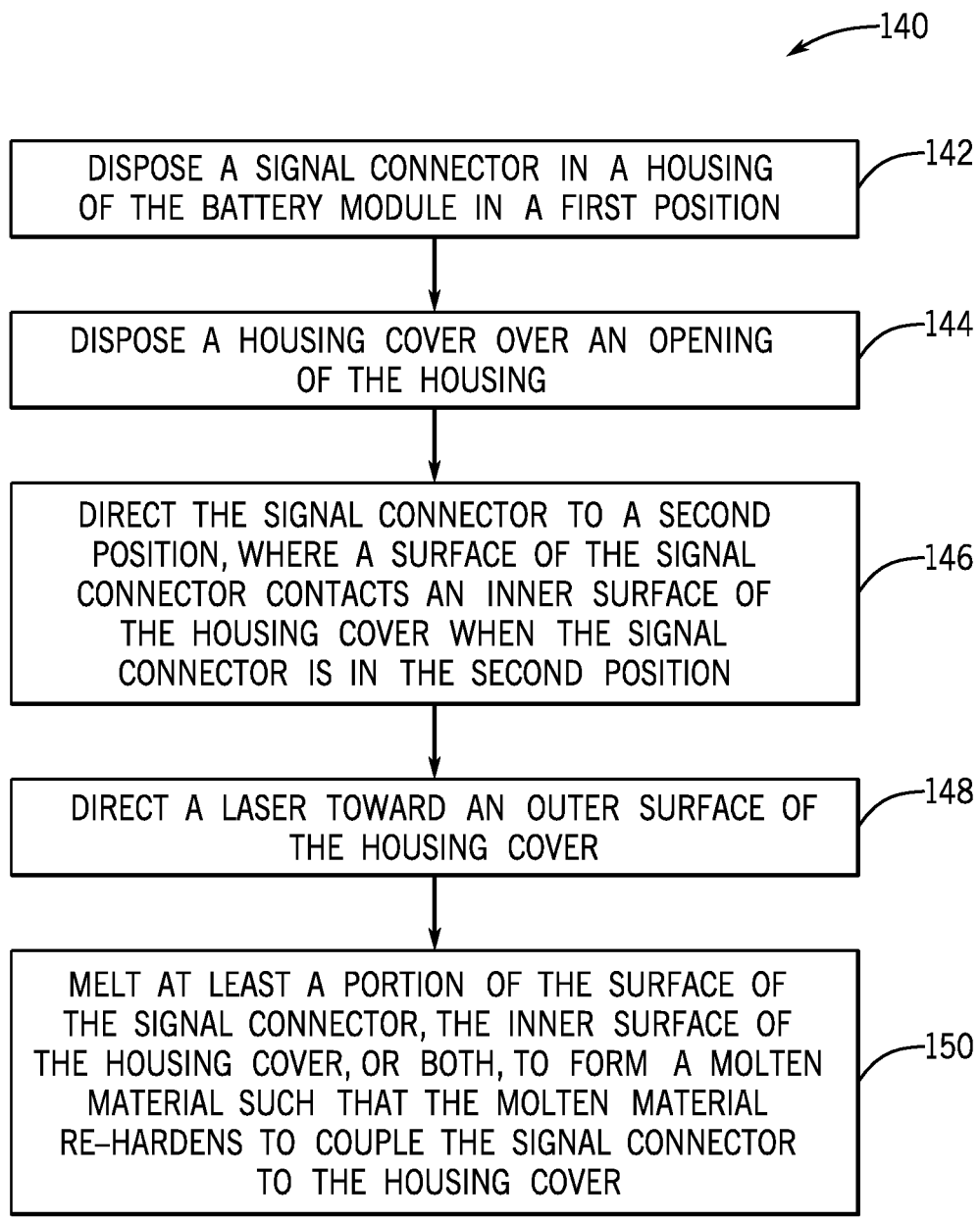
FIG. 9 is a block diagram of a process that may be used to couple the signal connector of FIGS. 5-8 to the housing cover, in accordance with an aspect of the present disclosure.

For example, FIG. 9 is a block diagram of a process 140 that may be used to weld or otherwise fixedly couple the signal connector 50 to the housing cover 54. At block 142, the signal connector 50 may be disposed in the housing 52 of the battery module 20 in the first position 66. As discussed above, when the signal connector 50 is in the first position 66, the housing cover 54 may be disposed over the opening 64 of the housing 52 without obstruction. Accordingly, at block 144, the housing cover 54 may be disposed over the opening 64 of the housing 52 (e.g., and placed into engagement with the housing 52) when the signal connector 50 is in the first position 66. In certain embodiments, the housing cover 54 may be sealed to the housing 52 such that the battery module 20 is substantially air-tight and/or water tight (except for the vent port 55).

At block 146, the signal connector 50 may be directed to the second position 130. As discussed above, the second position 130 may enable the contact surface 100 of the signal connector 50 to contact the inner surface 120 of the housing cover 54. The signal connector 50 may be directed to the second position 130 by the push device 132, for example, which may be inserted into the battery module 20 via the vent port 55. Accordingly, an assembler may apply a force in the direction 87 to the push device 132, and thus, to the push member 104, thereby driving the signal connector 50 in the direction 87. When the assembler cannot push the signal connector 50 any further, the assembler may stop applying the force because the contact surface 100 is in contact with the inner surface 120 of the housing cover 54. In other embodiments, the opening 84 in the harness 74 may include a sloped track such that the protrusion 86 of the signal connector 50 snaps (or clicks) into place when the signal connector 50 reaches the second position 130. Accordingly, the assembler may know that the signal connector 50 is in the second position 130 when the protrusion 86 snaps into place.

When the signal connector 50 has reached the second position 130, the signal connector 50 may be coupled (e.g., laser welded) to the housing cover 54, as shown at block 148. In certain embodiments, a laser may be directed toward an outer surface of the housing cover 54. As discussed above, the housing cover 54 may include a transparent material that may enable certain wavelengths of the laser to pass through the housing cover 54 toward the contact surface 100 of the signal connector 50. In certain embodiments, the contact surface 100 of the signal connector 50 may include an absorptive material, which may absorb the thermal energy output from the laser, thereby increasing a temperature of the contact surface 100. In other embodiments, the outer surface of the housing cover 54 may include a transparent material and the inner surface 120 of the housing cover 54 may include an absorptive material, which may absorb the thermal energy output from the laser. In such embodiments, a temperature of the inner surface 120 of the housing may increase.

When the temperature of the contact surface 100 and/or the inner surface 120 of the housing cover 54 increases, at least a portion of the contact surface 100 and/or the inner surface 120 of the housing cover 54 may melt, as shown at block 150. As a result, a molten material may form as the portion of the contact surface 100 and/or the inner surface 120 melts. In accordance with embodiments of the present disclosure, the molten material may contact both the contact surface 100 and the inner surface 120, such that when the laser is removed from the outer surface of the housing cover 54 (e.g., the laser is no longer directed toward the battery module) the molten material may re-harden and adhere to both the contact surface 100 and the inner surface 120. The contact surface 100 of the signal connector 50 and the inner surface 120 of the housing cover 54 may then be coupled to one another. Coupling the signal connector 50 to the housing cover 54 may enable the signal connector 50 to be accessible to the output connector such that a secure electrical connection between signal connector 50 and the output connector 58 may be formed.

One or more of the disclosed embodiments, alone or in combination, may provide one or more technical effects useful in the manufacture of battery modules, and portions of battery modules. In general, embodiments of the present disclosure include an improved technique for disposing a signal connector into a battery module housing and securing the signal connector within the housing. For example, the signal connector may be disposed in the housing, a cover may be placed over an opening of the housing, the signal connector may be directed (e.g., actuated) toward an opening in the housing and/or the cover, and the signal connector may be coupled (e.g., laser welded) to an inner surface of the housing and/or the cover. Embodiments of the present disclosure may enable sufficient access to the signal connector such that a reliable connection may be established between electrical components in the battery module and a control module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
 a housing comprising a first opening configured to receive one or more battery cells and an electrical component;

a housing cover configured to be disposed over the first opening to enclose the one or more battery cells and the electrical component in the housing;

a signal connector disposed within the housing and electrically coupled to the electrical component, wherein the signal connector is configured to be actuated from a first position to a second position; and a vent port in alignment with the signal connector such that a push member of the signal connector is accessible to a push device passing through the vent port to facilitate directing the signal connector into the second position and toward a second opening of the housing cover when the housing cover is disposed over the first opening.

2. The battery module of claim 1, comprising a laser weld coupling the signal connector to the housing cover such that the signal connector may receive an output connector to enable communication with a control module.

3. The battery module of claim 2, wherein the signal connector comprises an absorbent material configured to absorb a laser output from a laser configured to form the laser weld.

4. The battery module of claim 3, wherein the housing, the housing cover, or both comprise a transparent material configured to convey the laser output from the laser toward the signal connector.

5. The battery module of claim 2, wherein the control module is a vehicle control module (VCM).

6. The battery module of claim 5, wherein the VCM is configured to receive feedback from the electrical component.

7. The battery module of claim 6, wherein the feedback relates to an operating condition of the one or more battery cells.

8. The battery module of claim 1, wherein the signal connector comprises a contact surface including a geometry corresponding to an inner surface of the housing cover.

9. The battery module of claim 1, wherein the signal connector comprises a coupling adapter configured to protrude from the second opening and to receive an output connector to enable communication with a control module.

10. The battery module of claim 1, wherein the vent port includes a central axis substantially aligned with the push member of the signal connector when the housing cover is disposed over the first opening.

11. The battery module of claim 1, wherein the signal connector comprises a protrusion configured to be received in a carrier foil of a secured portion of the battery module such that movement of the signal connector in a first direction is blocked.

12. The battery module of claim 11, wherein the first direction is substantially crosswise to a second direction defined by a planar length of a bottom surface of the housing.

13. The battery module of claim 1, wherein a weld coupling the signal connector to the housing cover substantially seals the second opening.

14. The battery module of claim 13, wherein the weld comprises a laser weld.

15. A method of manufacturing a battery module, comprising:

disposing a signal connector in a housing of the battery module in a first position;

disposing a housing cover over an opening of the housing;

directing the signal connector to a second position, wherein a surface of the signal connector contacts an inner surface of the housing cover when the signal connector is in the second position;

directing a laser toward an outer surface of the housing cover; and melting at least a portion of the surface of the signal connector, the inner surface of the housing cover, or both, to form a molten material such that the molten material rehardens to couple the signal connector to the housing cover.

16. The method of claim 15, wherein directing the signal connector to the second position comprises inserting a push device into a vent port of the housing cover and pushing the signal connector with the push device toward the inner surface of the housing cover.

17. The method of claim 15, wherein the signal connector comprises a push member configured to rest on a securement feature of a carrier of the battery module, and wherein directing the signal connector to the second position comprises pushing the push member with a push device toward the inner surface of the housing cover.

* * * * *